July 29, 1930.  H. T. SHOGREN  1,771,587
FISHING TACKLE
Filed Sept. 19, 1929

Inventor
Herman T. Shogren
By Wheeler, Wheeler & Wheeler
Attorneys

Patented July 29, 1930

1,771,587

UNITED STATES PATENT OFFICE

HERMAN T. SHOGREN, OF MILWAUKEE, WISCONSIN

FISHING TACKLE

Application filed September 19, 1929. Serial No. 393,654.

This invention relates to improvements in fishing tackle.

It is the primary object of the invention to provide a fish lure capable of producing an illusory effect of the body and head of a minnow while providing fully exposed hooks in the area apparently occupied by such body.

It is a further object of the invention to provide a novel and improved plug bait readily adapted for use in conjunction with standard forms of fishing tackle and adapted when so used to co-act with such tackle to produce a novel and illusory effect as aforesaid, while leaving the hooks of such tackle fully exposed.

In the drawings.

Like parts are identified by the same reference characters throughout the several views.

Figure 1:
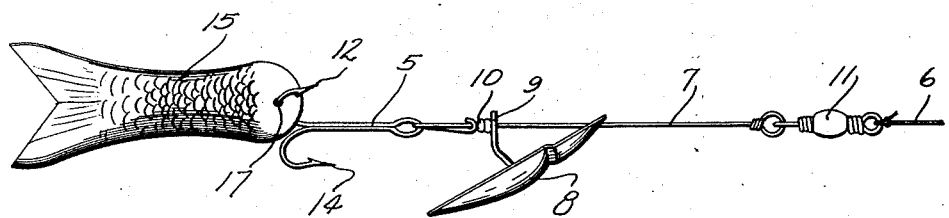
Figure 1 is a side elevation of fishing tackle embodying this invention.
Figure 2:
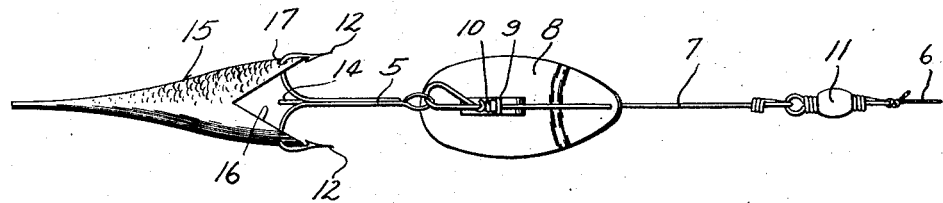
Figure 2 is a plan view of such tackle.
Figure 3:
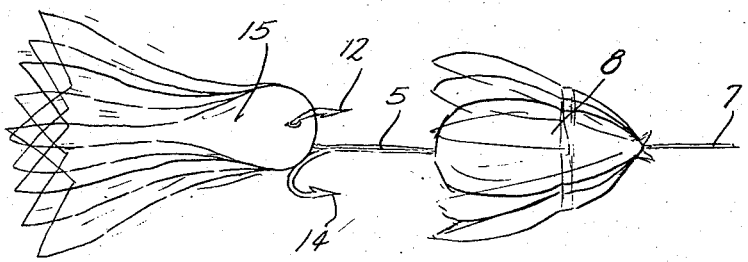
Figure 3 is a view diagrammatically illustrating the illusion produced by the tackle in use.

A triple barbed hook 5 of ordinary construction is connected to the line 6 by means of an ordinary wire leader 7 upon which the spoon 8 is rotatably mounted by means of bracket 9 and anti-friction beads 10. A swivel may be employed at 11 if desired, but it will be understood that the spoon 8 is freely revoluble on the leader 7.

Two of the hooks 12 of the triple hook assembly are utilized as a means of mounting the plug hereinafter to be described. The third hook 14 serves as a weight which maintains the plug erect so that in actual practice it moves through the water upright as illustrated in the drawings. The plug 15 is made to resemble the rear portion of a minnow of a size which will in general be proportioned to the size of the hook and spinner, so that the desired illusion will be created as hereinafter set forth. The plug may be furnished with a tail portion and a suitable painted design to simulate scales.

The plug 15 is notched at 16 to provide relatively thin forward extensions which are apertured at 17 to receive hooks 12. The arrangement is such that the plug is pivoted on the shank portions of the two hooks so that it will move freely in a vertical plane when in use. The arrangement is such that the tail will move about in the eddy produced by drawing the spinner 8 through the water and the effect of the combined operation of the spinner and the tail plug 15 is very realistic in simulating the movement of a minnow.

It is particularly to be noted that although the hooks 12 and 14 are completely exposed to engage any fish striking at the bait, the hooks are practically invisible when the bait is in use due to the illusion produced by the combined action of the spinner and tail plug. If the plug represented a complete minnow or other bait, it would be more or less obvious to the fish that the spinner was a thing apart. Due, however, to the fact that the plug comprises a replica of the tail portion only, the rapidly rotating spinner appears in actual use to be the front part of the minnow of which the plug is the tail. The spacing between the spinner and tail portion is so worked out as to create this effect and the disturbance produced in the water by the rapid rotation of the spinner is such that refraction tends to break up all light rays immediately behind the spinner and thereby to render the hooks invisible beyond and when a fish strikes at the bait there is nothing to interfere with its impalement on the exposed hooks.

I claim:

1. Fishing tackle comprising the combination with a spinner and a hook, of a plug spaced from said spinner beyond said hook and representing the tail portion only of a minnow.

2. Fishing tackle comprising the combination with a spinner and a hook, of a plug spaced from said spinner beyond said hook and representing the tail portion only of a minnow, the spacing between said plug and spinner being such that the spinner is in a position of the projecting head portion of a minnow of which the plug represents the tail.

3. Fishing tackle comprising the combination with a hook, a leader and a spinner, of a plug pivotally connected with the shank of said hook and representing the tail portion only of a bait, said plug being adapted to be set in motion by eddy currents resulting from the operation of the spinner.

4. The combination with a leader and a three pronged hook, of a spinner applied to said leader in advance of said hook, and a bait pivoted to the shank portions of two prongs of the hook.

5. The combination with a leader and a three pronged hook, of a spinner applied to said leader in advance of said hook, and a bait pivoted to the shank portions of two prongs of the hook, said bait comprising a plug simulating only the rear portion of a live bait.

6. The combination with a leader and a three pronged hook, of a spinner applied to said leader in advance of said hook, and a bait pivoted to the shank portions of two prongs of the hook, said bait comprising a plug and simulating the rear portion only of a minnow, and spaced from said spinner at approximately the distance that the tail part of the minnow simulated thereby is spaced from the head of such a minnow.

7. Fishing tackle comprising the combination with a three pronged hook, a leader therefor, and a spinner on said leader, of a plug in the form of a minnow's tail portion, said plug having a notch at its forward end and apertures in its sides engaged upon the shanks of the uppermost two prongs of said hook, the lowermost prong thereof being wholly unencumbered within said notch.

8. The combination with a three barbed hook, of a plug notched at its forward end and provided at its sides with apertures engaged over the uppermost prongs of said hook, the lower prong thereof being disposed beneath said notch.

9. The combination with a multiple pronged hook, of a plug provided with a pivoted connection to the shank portions of spaced prongs of said hook.

10. The combination with a multiple pronged hook, of a plug provided with a pivoted connection to the shank portions of spaced prongs of said hook, said plug being substantially wholly behind said hook.

11. The combination with a multiple pronged hook, of a plug provided with a pivoted connection to the shank portions of spaced prongs of said hook, said plug being substantially wholly behind said hooks, together with a spinner connected in advance of said hooks, the space between said spinner and said hooks being wholly free.

12. In fishing tackle, the combination with a hook and a spinner operatively mounted to turn in advance thereof, of a plug representing the tail portion only of a bait and pivotally connected with said hook and spinner to follow the hook.

13. As a new article of manufacture, a plug representing only the tail portion of a bait and provided with means for attaching it behind a hook.

14. As a new article of manufacture, a plug for fishing tackle comprising a member representing only the tail portion of a minnow and having spaced apertures adapted to receive shank portions of a multiple hook.

15. As a new article of manufacture, a plug representing only the tail portion of a minnow and provided at its forward end with a notch between its sides, the portions of such sides bounding a notch, being apertured.

HERMAN T. SHOGREN.